Oct. 31, 1950          G. L. RIGGINS          2,528,245
MOTOR VEHICLE EMERGENCY RELAY
Filed May 5, 1947
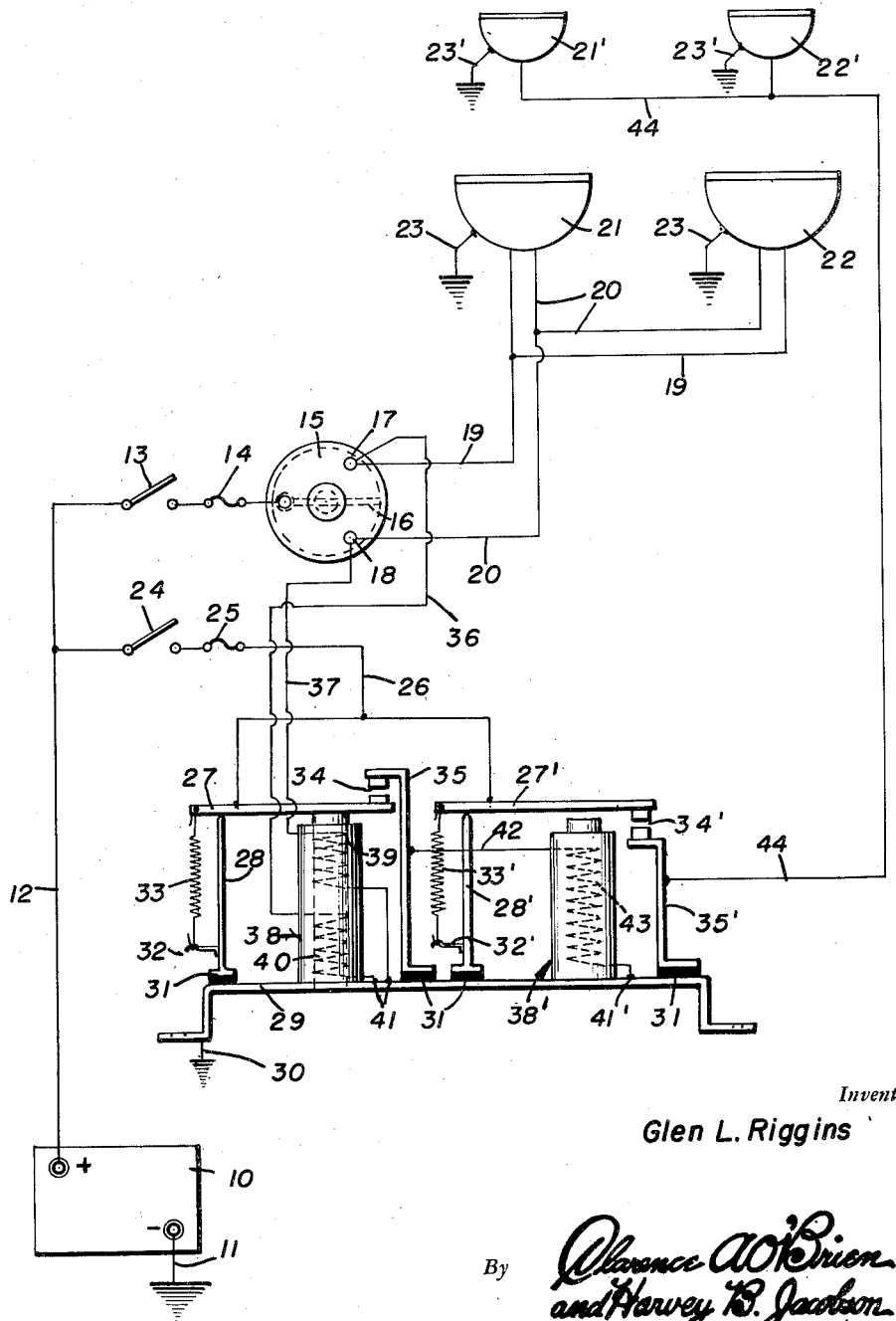
Inventor
Glen L. Riggins
By Clarence A. O'Brien
and Harvey B. Jackson
Attorneys Patented Oct. 31, 1950

2,528,245

UNITED STATES PATENT OFFICE 2,528,245

MOTOR VEHICLE EMERGENCY RELAY

Glen L. Riggins, Greene, Iowa, assignor of twenty per cent to Wesley G. Henke, Charles City, Iowa Application May 5, 1947, Serial No. 745,949

2 Claims. (Cl. 315—83)

This invention relates to a motor vehicle emergency light relay for auxiliary lighting systems for use on motor vehicles whereby, when the ordinary or normal head lights of the motor vehicle are out as a result of a blown out fuse or failure of the tilting, foot or other light switch, auxiliary lights will automatically be turned on, to insure driving with proper head lights, thereby avoiding accidents.

Another object of the invention is to provide an emergency light relay which is so wired that it will automatically light auxiliary lights when the head lights of the motor vehicle are out by reason of the circuit thereto being broken as a result of a blown out fuse, or failure of a tilting, foot or other light switch controlling the regular head lights.

Another object of the invention is to provide a novel emergency light relay connected with the ordinary lighting system in such a manner that auxiliary lights will be automatically lighted when the regular head lights are extinguished, or which can be so connected that the auxiliary lights will light separately or may be connected singly and will be automatically lighted by a blown out fuse interrupting the circuit through the regular head lights.

Other objects and advantages reside in the details of construction and operation as more fully hereinafter described and claimed, reference being had to the accompanying drawings forming part hereof, wherein like numerals refer to like parts throughout, and in which:

The figure of the drawing is a diagrammatic view showing the circuit in connection with the regular and emergency head lights, and the relay controlling the latter.

Referring to the drawing, the battery 10 which is grounded to the frame of the automobile, as indicated at 11, has its positive pole connected by the conductor 12 through a light switch 13 and fuse 14 with a tilting, foot or other light switch 15 having a movable contact 16 arranged to engage stationary contacts 17 and 18 independently connected by conductors or wires 19 and 20 to the bright and dim filaments of the head lights 21 and 22 which are grounded to the frame of the automobile, as indicated at 23. This is the ordinary hook-up in most motor vehicles.

The conductor or wire 12 also is connected with an auxiliary light switch 24 with a fuse 25, which may be enclosed in the relay box and then by a conductor or wire 26 to an armature 27 of the emergency light relay 38 suitably fulcrumed on a pivot support 28 carried by a bracket 29 suitably attached to the car frame which it is grounded, as indicated at 30. The fulcrum or pivot support 28 is however insulated from the bracket 29, as indicated at 31, and carries an arm 32 to which one end of a spring 33 is connected while the other end of the spring is connected to the adjacent or short arm of the armature 27. Cooperating contact points 34 are provided between the long arm of the armature 27 at its free end and a support 35 which is also supported on and insulated from the bracket 29 and frame in the same manner as the armature support pivot 28.

The contacts 17 and 18 for dimmed and bright beams of the lamps are connected by wires 36 and 37 with coils 39 and 40 of relay 38, respectively, the opposite ends of the coils or windings being grounded to the bracket 29 and frame of the automobile, as indicated at 41, by electrical connection with the bracket. It should be noted that the contact carried by the armature 27 is movable relative to the stationary contact carried by the support 35, these being the usual contact points which are normally closed.

The wire 26 connected to the armature 27, is also connected through a further branch to a similar armature 27' fulcrumed on a support pivot 28' similarly mounted upon and insulated from the bracket 29 and the frame of the car. An arm 32' is provided on the support 28' to which one end of a spring 33' is connected, while the other end is connected to the adjacent end of the short arm of the armature 27'. Contact points 34', one carried by and movable with the free end of the armature 27' and the other fixed to a support 35' mounted upon and insulated from the bracket 29 and the frame of the car, cooperate with each other and are normally spaced apart under the action of the spring 33'. The contact carried by the support 35 is connected by wire 42 with a relay 38' having a single coil 43 which is connected to the grounded bracket 29, as indicated at 41'.

Connection is made through a conductor or wire 44 at the support 35' with auxiliary head lights 21' and 22', which are, in turn, connected to the grounded frame of the automobile, as indicated at 23'. These auxiliary head lights are preferably of a single filament type, as distinguished from the dual filament type employed in connection with the regular or normal head lights 21 and 22.

In the operation of the system, with the light switch 13 closed and movable contact 16 of the switch 15 shifted into engagement with either one of the contacts 17 and 18, the dim or low and bright or high beams of the head lights 21 and 22 may be lighted. However, should there be a failure in the lighting circuit of said head lights due to blowing of the fuse 14 or failure of the foot or other light switch 15, by closing the auxiliary light switch 24 is closed and, current flows through the fuse 25 and wire 26 to the armature 27, and as contact points 34 are closed the current will now flow to the auxiliary head lights 21' and 22'. However, when the head lights 21 and 22 are on, either dim or bright, current will flow from one of the contacts 17 or 18, depending upon which is engaged by the movable contact 16, to the relay 38 through the wires 36 or 37. The coils 39 and 40 of said relay will be energized, depending upon whether the dim or low, or the bright or high lights or beams are turned on. Since the coils 39 and 40 are grounded at 41, the armature 27 will be pulled down thus opening the contact points 34.

However, when the head lights 21 and 22 fail, the points 34 engage or come together by current flowing through either one of the coils 39 or 40 being cut off, due to the action of the spring 33. When the points 34 are engaged or brought together, the current flows through the wire 42 through the support 35 to the relay 38' and consequently to the frame grounded at 41'. This pulls down the armature 27' by the energization of the coil 43 of relay 38', this causing engagement of the contact points 34', thereby completing the circuit through the wire 44 to the auxiliary head lights 21' and 22', the support 35', and the head lights 21' and 22' being grounded as shown and described. Otherwise the spring 33' will hold the contact points 34' normally separated. Thus, the auxiliary head lights will be lighted separately by closing the switch 24 provided current is not flowing through the regular head light circiut in such a manner as to open the contact points 34. Also, the auxiliary lights will be lighted with the parking lights on.

The relay as described can be connected single by using either wire 36 or 37 connected to the conductor or wire 12 between the fuse 14 and the switch 15. In this event, the auxiliary head lights will light in the event that the fuse 14 is blown, but will not be affected by a bad or inoperative switch 15, which may be a tilting, foot or other light switch. However, the device can also be connected single by using a single coil in connection with the relay 38, instead of two coils 39 and 40, and connecting in series with the ground leads 23 of the head lights 21 and 22, or either one of them. In this instance, the auxiliary lights will light with a blown fuse 14, a bad or ineffective tilting switch 15 and the head light to which the relay coil is connected at the ground lead 23 in the event the filament thereof burns out. This hook-up gives a little voltage drop through the head light connected to the relay. Also, instead of the wiring as above set forth, the relay comprising the parts which are primed, such as 27', 28', etc., and the coil 43 of the electromagnet 38', may be eliminated, and the wire 42 connected directly to the auxiliary head lights 21' and 22'. In such event, the spring 33 would preferably be stronger and larger and the coil of the relay 38 also stronger.

With this equipment on a motor vehicle, the lights are assured due to the auxiliary head lights 21' and 22', even though the regular lighting system becomes inoperative and the driver is thereby assured of lights in the usual emergency due to failing head lights. Obviously, this will prevent collisions and accidents.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

What I claim as new is:

1. An emergency lighting system for automobiles, comprising main headlights provided with filaments for bright and for dimmed lights, a dimmer switch, provided with a movable contact arm and fixed contacts alternatively contacted by said arm, a source of current, an energizing circuit for each of said filaments leading from the same to one of the fixed contacts of the dimmer switch, a supply connection between said source of current and the contact arm of the dimmer switch, a fuse in said connection, auxiliary headlights, an energizing circuit for the same, including an independent connection with the source of current, and a separate independent fuse in said connection, said energizing circuit containing solely a single control contact, a group of inter-related relays, consisting of a relay with a double winding and a relay with a single winding, the latter provided with an armature carrying the said single control contact, energizing circuits arranged in parallel with the energizing circuits of the filaments for the two windings of the double winding relay, and means controlled by the double winding relay for connecting the single winding relay over an independent connection with a source of current upon deenergization of the double winding relay.

2. An emergency lighting system for automobiles, comprising main headlights provided with filaments for bright and for dimmed lights, a dimmer switch, provided with a movable contact arm and fixed contacts alternatively contacted by said arm, a source of current, a main headlight circuit for each of the filaments of the main headlight, leading from the same to one of the fixed contacts of the dimmer switch, a supply connection between said source of current and the contact arm of the dimmer switch, a fuse in said connection, auxiliary headlights, an auxiliary headlight circuit for the same, including an independent connection with the source of current, and a separate independent fuse in said connection, said auxiliary headlight circuit containing solely a single control contact, a group of inter-related relays, consisting of a relay with a double winding and a relay with a single winding, the latter provided with an armature, carrying the aforesaid control contact and biased to keep the same open in its position of rest, an energizing circuit for the single winding relay, controlled by the double winding relay, said energizing circuit being a parallel branch circuit of the auxiliary headlight circuit, a control contact, closed in its position of rest, in said energizing circuit, an armature operated by the double winding relay, carrying said last named control contact and biased for contact closure, a separate relay winding energizing circuit for each winding of said double winding relay connected in parallel with the circuits of the filaments of the main headlights respectively, the auxiliary headlights being automatically substituted for the main headlights upon current interruption by the fuse or in the dimmer switch, while keeping the main and auxiliary headlight circuits free of control relays.

GLEN L. RIGGINS.

REFERENCES CITED

The following references are of record in the file of this patent:

UNITED STATES PATENTS

| Number | Name | Date |
| --- | --- | --- |
| 959,770 | McDonald | May 31, 1910 |
| 1,925,200 | Miller | Sept. 5, 1933 |
| 1,938,828 | Gordon | Dec. 12, 1933 |
| 2,177,618 | Montgomery | Oct. 24, 1939 |
| 2,381,169 | Jones | Aug. 7, 1945 |
| 2,427,076 | Tabacci | Sept. 9, 1947 |